(12) United States Patent
Irizarry

(10) Patent No.: US 8,231,704 B2
(45) Date of Patent: *Jul. 31, 2012

(54) SILVER PARTICLES AND PROCESSES FOR MAKING THEM

(75) Inventor: Roberto Irizarry, Raleigh, NC (US)

(73) Assignee: E I du Pont de Nemours and Company, Wilmington, DE (US)

(*) Notice: Subject to any disclaimer, the term of this patent is extended or adjusted under 35 U.S.C. 154(b) by 173 days.

This patent is subject to a terminal disclaimer.

(21) Appl. No.: 12/770,846

(22) Filed: Apr. 30, 2010

(65) Prior Publication Data

US 2010/0279116 A1 Nov. 4, 2010

Related U.S. Application Data

(60) Provisional application No. 61/174,590, filed on May 1, 2009, provisional application No. 61/174,591, filed on May 1, 2009.

(51) Int. Cl.
B22F 9/24 (2006.01)
(52) U.S. Cl. .................... 75/371; 75/741; 977/896
(58) Field of Classification Search ............... None
See application file for complete search history.

(56) References Cited

U.S. PATENT DOCUMENTS

| 5,389,122 | A | 2/1995 | Glicksman |
| 7,648,557 | B2 | 1/2010 | Irizarry-Rivera |
| 2005/0257643 | A1 | 11/2005 | Ogi et al. |
| 2005/0279970 | A1 | 12/2005 | Ogi et al. |
| 2007/0079665 | A1 | 4/2007 | Sasaki et al. |
| 2007/0244003 | A1* | 10/2007 | Majima et al. ............. 502/319 |
| 2008/0138238 | A1 | 6/2008 | Sasaki et al. |
| 2008/0254567 | A1 | 10/2008 | Konno |
| 2009/0116998 | A1* | 5/2009 | Fujimoto et al. .......... 420/501 |
| 2010/0101637 | A1 | 4/2010 | Yamasaki et al. |

FOREIGN PATENT DOCUMENTS

| CN | 101579746 A | 11/2009 |
| JP | 63-307206 A | 12/1988 |
| JP | 2007-270312 A | 10/2004 |
| JP | 2006-6225760 A | 8/2006 |
| JP | 2010-070793 A | 4/2010 |
| WO | 2007/143125 A2 | 12/2007 |

OTHER PUBLICATIONS

International Search Report Dated September 28, 2010 for International Application No. PCT/US2010/033380.
Widoniak et al., Silver Particles Tailoring of Shapes and Sizes, Colloids and Surfaces A: Physicachemical and Engineering Aspects, Dec. 1, 2005, pp. 340-344, vol. 270-271.
Nagaoka et al., Investigation and Application of Silver Powder Reduced With L-Ascorbic Acid (or LAX AG), International Precious Metals Conference, Jun. 14, 2003, pp. 9-21.

(Continued)

Primary Examiner — George Wyszomierski

(57) ABSTRACT

A silver powder comprising silver particles, each silver particle comprising silver components 100-2000 nm long, 20-100 nm wide and 20-100 nm thick assembled to form a spherically-shaped, open-structured particle, wherein the $d_{50}$ particle size is from about 2.5 μm to about 6 μm is disclosed. Also disclosed is a process for making these silver particles. The silver particles formed are particularly useful in electronic applications.

4 Claims, 2 Drawing Sheets

OTHER PUBLICATIONS

Lim et al., A Statistical Design and Analysis Illustrating the Interactions Between Key Experimental Factors for the Synthesis of Silver Nanoparticles, Colloids and Surfaces A: Physicachemical and Engineering Aspects, Jun. 5, 2008, pp. 155-163, vol. 322, No. 1-3.

Sondi et al., Preparation of Highly Concentrated Stable Dispersions of Uniform Silver Nanoparticles, Journal of Colloid and Interface Science, Apr. 1, 2003, p. 75-81, vol. 260, No. 1.

Velikov et al., Synthesis and Characterization of Large Colloidal Silver Particles, Langmuir, Feb. 18, 2003, pp. 1384-1389, vol. 19, No. 4.

Halaciuga et al., Preparation of Silver Spheres by Aggregation of Nanosize Subunits, Journal of Materials Research, Jun. 6, 2008, p. 1776-1784, vol. 23, No. 6.

Suber et al., Preparation and the Mechanisms of Formation of Silver Particles of Different Morphologies in Homogeneous Solutions, Journal of Colloid and Interface Science, 2005, pp. 489-495, vol. 288.

U.S. Appl. No. 12/770,902, filed Apr. 30, 2010.

U.S. Appl. No. 12/770,842, filed Apr. 30, 2010.

U.S. Appl. No. 12/871,167, filed Aug. 30, 2010.

U.S. Appl. No. 12/948,098, filed Nov. 17, 2010.

Dai et al., Preparation and Characterization of Fine Silver Powder With Colloidal Emulsion Aphrons, Journal of Membrane Science, Sep. 15, 2006, pp. 685-691, vol. 281, No. 1-2.

* cited by examiner

SILVER PARTICLES AND PROCESSES FOR MAKING THEM

FIELD OF THE INVENTION

The invention is directed to highly dispersible silver particles with a unique morphology and a process for making them. These silver particles are particularly useful in electronic applications.

TECHNICAL BACKGROUND OF THE INVENTION

Silver powder is used in the electronics industry for the manufacture of conductor thick film pastes. The thick film pastes are screen printed onto substrates forming conductive circuit patterns. These circuits are then dried and fired to volatilize the liquid organic vehicle and sinter the silver particles.

Printed circuit technology is requiring denser and more precise electronic circuits. To meet these requirements, the conductive lines have become narrower in width with smaller distances between lines. The silver powder particles necessary to form dense, closely packed, narrow lines must be as close as possible to monosized, dense packing spheres. Most existing spherical particles have smooth surfaces. The use of powders comprised of such particles results in having limited latitude when sintering Many processes currently used to manufacture metal powders can be applied to the production of silver powders. For example, thermal decomposition processes, electrochemical processes, physical processes such as atomization or milling and chemical reduction processes can be used. Thermal decomposition processes tend to produce powders that are spongy, agglomerated, and very porous whereas electrochemical processes produce powders that are crystalline in shape and very large. Physical processes are generally used to make flaked materials or very large spherical particles. Chemical precipitation processes produce silver powders with a range of sizes and shapes.

Silver powders used in electronic applications are generally manufactured using chemical precipitation processes. Silver powder is produced by chemical reduction in which an aqueous solution of a soluble salt of silver is reacted with an appropriate reducing agent under conditions such that silver powder can be precipitated. Inorganic reducing agents including hydrazine, sulfite salts and formate salts can produce powders which are very coarse in size, are irregularly shaped and have a large particle size distribution due to aggregation. Organic reducing agents such as alcohols, sugars or aldehydes are used with alkali hydroxides to reduce silver nitrate. The reduction reaction is very fast; hard to control and produces a powder contaminated with residual alkali ions. Although small in size (<1 μm), these powders tend to have an irregular shape with a wide distribution of particle sizes that do not pack well. It is difficult to control the sintering of these types of silver powders and they do not provide adequate line resolution in thick film conductor circuits.

Therefore, there is a need to produce particles with a morphology that results in the particles being more easily sintered and a process to readily make them.

SUMMARY OF THE INVENTION

This invention provides a silver powder comprising silver particles, each silver particle comprising silver components 100-2000 nm long, 20-100 nm wide and 20-100 nm thick assembled to form a spherically-shaped, open-structured particle, wherein the $d_{50}$ particle size is from about 2.5 μm to about 6 μm.

There is also provided a process for making a silver powder comprising silver particles, each silver particle comprising silver components 100-2000 nm long, 20-100 nm wide and 20-100 nm thick assembled to form a spherically-shaped, open-structured particle, wherein the $d_{50}$ particle size is from about 2.5 μm to about 6 μm. That process comprises:

(a) preparing an acidic aqueous silver salt solution comprising a water soluble silver salt dissolved in deionized water;

(b) preparing an acidic reducing and surface morphology modifier solution comprising:
  (i) a reducing agent selected from the group consisting of an ascorbic acid, an ascorbate and mixtures thereof dissolved in deionized water;
  (ii) nitric acid; and
  (iii) a surface morphology modifier selected from the group consisting of sodium citrate, citric acid and mixtures thereof;

(c) maintaining the acidic aqueous silver salt solution and the acidic reducing and surface morphology modifier solution at the same temperature, wherein that temperature is in the range of about 65° C. to about 90° C., while stirring each solution; and (d) mixing the acidic aqueous silver salt solution and the acidic reducing and surface morphology modifier solution over a period of less than 10 seconds with no stirring to make a reaction mixture, maintaining the reaction mixture at the temperature of (c) and after 3 to 7 minutes stirring the reaction mixture for 2 to 5 minutes to produce the silver powder particles in a final aqueous solution.

Also provided is the above process further comprising:

(e) separating the silver powder particles from the final aqueous solution;

(f) washing the silver powder particles with deionized water; and (g) drying the silver powder particles.

The above acidic reducing and surface morphology modifier solutions can optionally contain a dispersing agent.

DETAILED DESCRIPTION OF THE INVENTION

Figure 1:
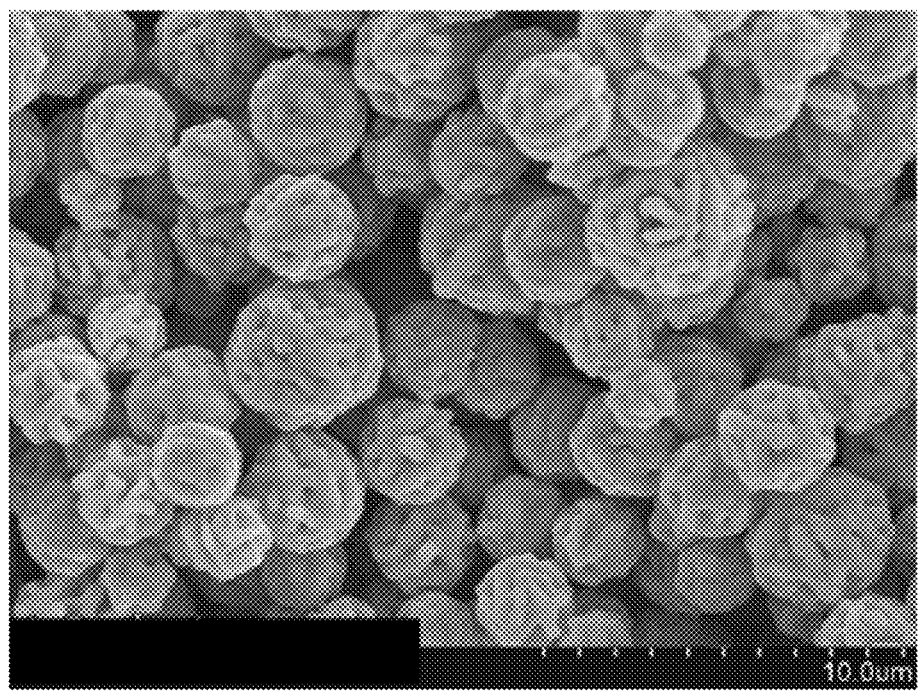
FIG. 1 is a scanning electron microscope image at a magnification of 5,000 of the silver powder made in Example 1 and comprising silver particles, each silver particle comprising silver components 100-2000 nm long, 20-100 nm wide and 20-100 thick assembled to form a spherically-shaped, open-structured particle, wherein the $d_{50}$ particle size is 3.6 μm.

This invention provides a silver powder comprising silver particles and a process for making the silver powder comprising silver particles. In the powder, each silver particle is comprised of silver components 100-2000 nm long, 20-100 nm wide and 20-100 nm thick assembled to form a spherically-shaped, open-structured particle, wherein the $d_{50}$ particle size is from about 2.5 μm to about 6 μm. The structure of these particles is clearly shown in the scanning electron microscope (SEM) images of FIG. 1 at 5,000 magnification and FIG. 2 at 15,000 magnification. The particles are described herein as spherically-shaped. It can be seen from the SEM images that the particles are generally spherical in shape but are not perfect spheres. The silver components making up the particles are evident as is the irregular surface that they form.

The silver particle density measured by helium picnometry is about 9.5-9.99.

The process for forming the powders of this invention is a reductive process in which silver particles with controlled structures are precipitated by adding together an acidic aqueous solution of a water soluble silver salt and an acidic aqueous reducing and surface morphology modifier solution containing a reducing agent, nitric acid and a surface morphology modifier.

The acidic aqueous silver salt solution is prepared by adding a water soluble silver salt to deionized water. Any water soluble silver salt, e.g., silver nitrate, silver phosphate, and silver sulfate, can be used. Silver nitrate is preferred. No complexing agents are used which could provide side reactions that affect the reduction and type of particles produced. Nitric acid can be added to increase the acidity.

The process can be run at concentrations up to 0.8 moles of silver per liter of final aqueous solution. It is preferred to run the process at concentrations less than or equal to 0.47 moles of silver per liter of final aqueous solution. These relatively high concentrations of silver make the manufacturing process cost effective.

The acidic reducing and surface morphology modifier solution is prepared by first dissolving the reducing agent in deionized water. Suitable reducing agents for the process are ascorbic acids such as L-ascorbic acid and D-ascorbic acid and related ascorbates such as sodium ascorbate.

Nitric acid and the surface morphology modifier are then added to the mixture. The processes are run such that the pH of the solution after the reduction is completed (final aqueous solution) is less than or equal to 6, most preferably less than 2. This pH is adjusted by adding sufficient nitric acid to the reducing and surface morphology modifier solution and, optionally, to the acidic aqueous silver solution prior to the mixture of these two solutions and the formation of the silver particles. This pH is also adjusted by adding sufficient NaOH to the reducing and surface morphology modifier solution.

The surface morphology modifier serves to control the structure of the silver particles and is selected from the group consisting of sodium citrate, citrate salts, citric acid and mixtures thereof. Sodium citrate is preferred. The amount of the surface modifier used ranges from 0.001 gram of surface modifier per gram of silver to greater than 0.5 gram of surface modifier per gram of silver. The preferred range is from about 0.02 to about 0.3 gram of surface modifier per gram of silver.

In addition, a dispersing agent selected from the group consisting of ammonium stearate, stearate salts, polyethylene glycol with molecular weight ranging from 200 to 8000, and mixtures thereof can be added to the reducing and surface morphology modifier solution.

The order of preparing the acidic aqueous silver salt solution and the acidic reducing and surface morphology modifier solution is not important. The acidic aqueous silver salt solution can be prepared before, after, or contemporaneously with the acidic reducing and surface morphology modifier solution. Either solution can be added to the other to form the reaction mixture. The two solutions are mixed quickly with a minimum of agitation to avoid agglomeration of the silver particles. By mixing quickly is meant that the two solutions are mixed over a period of less than 10 seconds, preferably of less than 5 seconds.

In the process for making silver particles comprising silver components 100-2000 nm long, 20-100 nm wide and 20-100 nm thick assembled to form a spherically-shaped, open-structured particle, wherein the $d_{50}$ particle size is from about 2.5 μm to about 6 μm, the acidic aqueous silver salt solution and the acidic reducing and surface morphology modifier solution are both maintained at the same temperature, i.e., a temperature in the range of about 65° C. to about 90° C. and each solution is stirred. When the two solutions are mixed to form the reaction mixture, the reaction mixture is maintained at that same temperature.

In this process, after the reaction mixture is formed, there is no agitation or stirring for a period of 3 to 7 minutes after which the reaction mixture is stirred for 2 to 5 minutes. The result is a final aqueous solution containing the silver particles. It is this final aqueous solution that has a pH less than or equal to 6, most preferably less than 2.

The silver particles are then separated from the final aqueous solution by filtration or other suitable liquid-solid separation operation and the solids are washed with deionized water until the conductivity of the wash water is 100 microsiemans or less. The silver particles are then dried.

The silver particles of this invention can be used in thick film paste applications, including thick films for front side metallization of photovoltaic solar cells. The structures of these particles and their surfaces will lend them to be more readily sintered.

EXAMPLES

The following examples and discussion are offered to further illustrate, but not limit the process of this invention. Note that particle size distribution numbers ($d_{10}$, $d_{50}$, $d_{90}$) were measured using a Microtrac® Particle Size Analyzer from Leeds and Northrup. The $d_{10}$, $d_{50}$ and $d_{90}$ represent the 10th percentile, the median or 50th percentile and the 90th percentile of the particle size distribution, respectively, as measured by volume. That is, the $d_{50}$ ($d_{10}$, $d_{90}$) is a value on the distribution such that 50% (10%, 90%) of the particles have a volume of this value or less.

Example 1

The acidic aqueous silver salt solution was prepared by dissolving 80 g of silver nitrate in 250 g of deionized water. This solution was kept at 70° C. while continuously stirring.

The acidic reducing and surface morphology modifier solution was prepared by adding and dissolving 45 g of ascorbic acid to 750 g of deionized water in a separate container from the silver nitrate solution. This solution was kept at 70° C. while continuously stirring. 20 g of nitric acid was then added to the solution followed by the addition of 10 g of sodium citrate.

After both solutions were prepared, the acidic aqueous silver nitrate solution was added to the acidic reducing and surface morphology modifier solution without any additional agitation or stirring in less than 5 seconds to make a reaction mixture that was maintained at 70° C. After five minutes, the reaction mixture was stirred for 3 minutes.

The reaction mixture was filtered and the silver powder collected. The silver powder was washed with deionized water until a conductivity of the wash water was less than or equal to 100 microsiemans. The silver powder was dried for 30 hours at 30° C.

Figure 2:
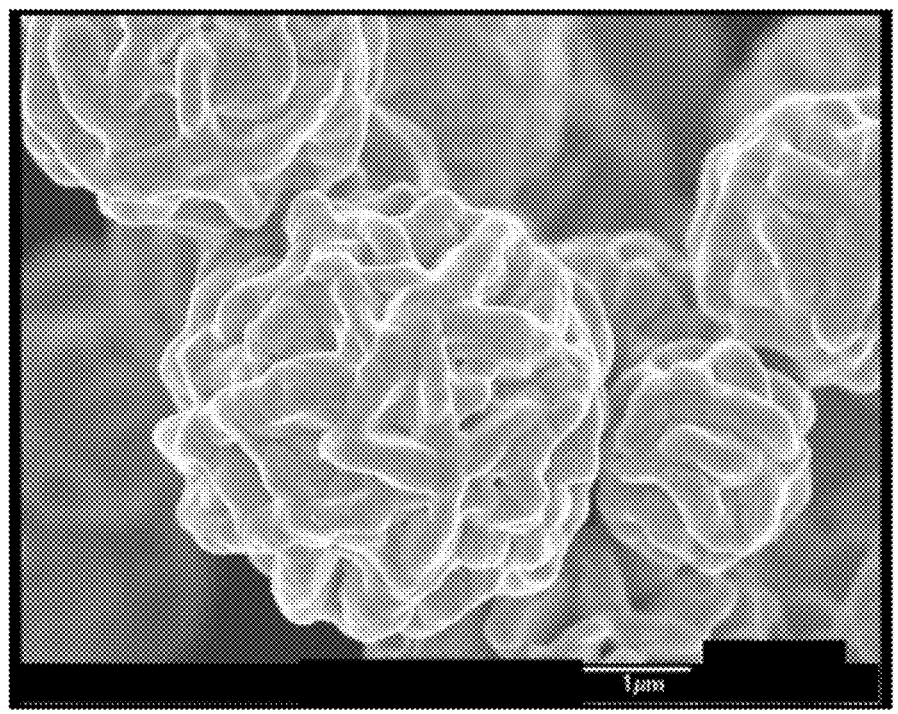
FIG. 2 is a scanning electron microscope image at a magnification of 15,000 of the same silver powder shown in FIG. 1.

The silver powder was comprised of silver particles, each particle comprising silver components 100-2000 nm long, 20-100 nm wide and 20-100 nm thick assembled to form a spherically-shaped, open-structured particle as shown in the scanning electron microscope images of FIGS. 1 (5,000 magnification) and 2 (15,000 magnification). The size of the silver components making up the silver particles were obtained from the scanning electron microscope images. $d_{10}$, $d_{50}$, and $d_{90}$ were 2.5 µm, 3.6 µm and 5.9 µm, respectively.

Example 2

Example 2 was made using the process described in Example 1 except that 1.0 g of sodium citrate was added to the acidic reducing and surface morphology modifier solution instead of 10 g and 0.5 g of polyethylene glycol was added to the acidic reducing and surface morphology modifier solution. A scanning electron microscope image showed particles with structure similar to that shown in FIGS. 1 and 2. The $d_{10}$, $d_{50}$, and $d_{90}$ were 2.1 µm, 3.3 µm and 5.7 µm, respectively.

Example 3

Example 3 was made using the process described in Example 1 except that 5 g of sodium citrate was added to the acidic reducing and surface morphology modifier solution instead of 10 g. A scanning electron microscope image showed particles with structure similar to that shown in FIGS. 1 and 2. The $d_{10}$, $d_{50}$, and $d_{90}$ were 2.2 µm, 3.7 µm and 6.6 µm, respectively.

Comparative Example

The acidic aqueous silver salt solution was prepared by dissolving 80 g of silver nitrate in 250 g of deionized water. This solution was kept at 50° C. while continuously stirring.

The acidic reducing and surface morphology modifier solution was prepared by adding and dissolving 45 g of ascorbic acid to 750 g of deionized water in a separate container from the silver nitrate solution. This solution was kept at 50° C. while continuously stirring. 20 g of nitric acid was then added to the solution followed by the addition of 5 g of sodium citrate and 0.5 g of polyethylene glycol.

After both solutions were prepared, the acidic aqueous silver nitrate solution was added to the acidic reducing and surface morphology modifier solution without any additional agitation or stirring in less than 5 seconds to make a reaction mixture that was maintained at 50° C. After five minutes, the reaction mixture was stirred for 3 minutes.

The reaction mixture was filtered and the silver powder collected. The silver powder was washed with deionized water until a conductivity of the wash water was less than or equal to 100 microsiemans. The finished silver powder was dried for 30 hours at 30° C.

Figure 3:
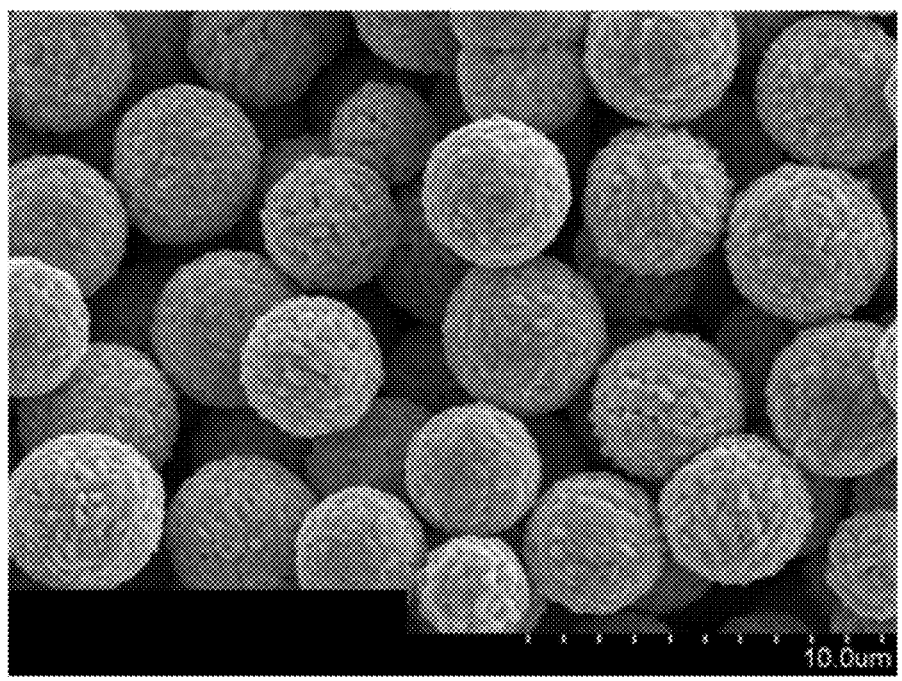
FIG. 3 is a scanning electron microscope image at a magnification of 5,000 of the silver powder made in Comparative Example 1 comprising silver particles, each silver particle comprising silver components 100-500 nm long, 80-100 nm wide and 80-100 nm thick in size assembled to form a spherically-shaped, open structured particle, wherein the surface of the particle resembles the surface of the rind of an orange and the $d_{50}$ particle size is 4.2 μm.

The silver powder was comprised of silver particles, each particle comprising silver components 100-500 nm long, 80-100 nm wide and 80-100 nm thick assembled to form a spherically-shaped, open structured particle, wherein the surface of the particle resembles the surface of the rind of an orange as shown in the scanning electron microscope image of FIGS. 3 (5,000 magnification) and 4 (10,000 magnification). The size of the silver components making up the silver particles were obtained from the scanning electron microscope image. The $d_{10}$, $d_{50}$, and $d_{90}$ were 3.2 µm, 4.2 µm and 6.1 µm, respectively.

Comparative Example 2

Figure 4:
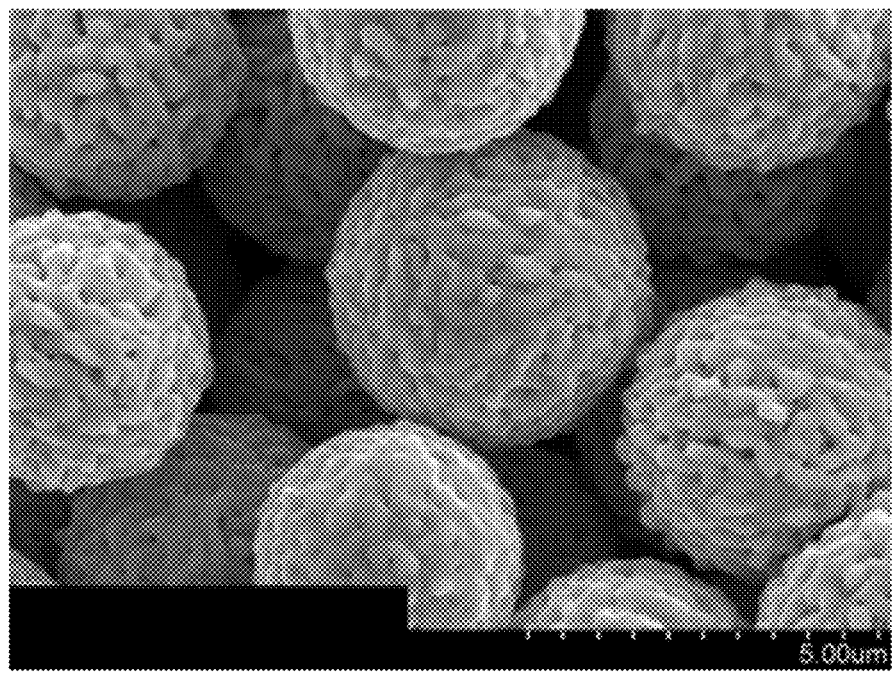
FIG. 4 is a scanning electron microscope image at a magnification of 10,000 of the same silver powder shown in FIG. 3.

Comparative Example 2 was made using the process described in Comparative Example 1 except that 10 g of sodium citrate was added to the acidic reducing and surface morphology modifier solution instead of 5 g. A scanning electron microscope image showed particles with structure similar to that shown in FIGS. 3 and 4. The $d_{10}$, $d_{50}$, and $d_{90}$ were 2.4 µm, 3.3 µm and 5.1 µm, respectively. The use of the larger amount of sodium citrate results in lower $d_{50}$.

Comparative Example 3

Comparative Example 3 was made using the process described in Comparative Example 1 except that no polyethylene glycol was added to the acidic reducing and surface morphology modifier solution, 10 g of sodium citrate was added to the acidic reducing and surface morphology modifier solution instead of 5 g and and the acidic aqueous silver salt solution, the acidic reducing and surface morphology modifier solution and the reaction mixture were kept at 25° instead of 50° C. A scanning electron microscope image showed particles with structure similar to that shown in FIGS. 3 and 4, but much smaller in size. The $d_{10}$, $d_{50}$, and $d_{90}$ were 0.9 µm, 2.6 µm and 7.1 µm, respectively.

What is claimed is:
1. A process for making a silver powder comprising silver particles, each said silver particle comprising silver components 100-2000 nm long, 20-100 nm wide and 20-100 nm thick assembled to form a spherically-shaped, open-structured particle substantially as shown in FIG. 1, wherein the silver particles have a $d_{50}$ particle size of from about 2.5 µm to about 6 µm, said process comprising:
    (a) preparing an acidic aqueous silver salt solution comprising a water soluble silver salt dissolved in deionized water;
    (b) preparing an acidic reducing and surface morphology modifier solution comprising:
        (i) a reducing agent selected from the group consisting of an ascorbic acid, an ascorbate and mixtures thereof dissolved in deionized water;
        (ii) nitric acid; and
        (iii) a surface morphology modifier selected from the group consisting of sodium citrate, citric acid and a mixture thereof;
    (c) maintaining said acidic aqueous silver salt solution and said acidic reducing and surface morphology modifier solution at the same temperature, wherein said temperature is in the range of about 65° C. to about 90° C., while stirring each said solution; and
    (d) mixing said acidic aqueous silver salt solution and said acidic reducing and surface morphology modifier solution over a period of less than 10 seconds with no stirring to make a reaction mixture, maintaining said reaction mixture at said temperature of (c) and after 3 to 7 minutes stirring said reaction mixture for 2 to 5 minutes to produce said silver powder particles in a final aqueous solution.

2. The process of claim 1, further comprising:
(e) separating said silver powder particles from said final aqueous solution;
(f) washing said silver powder particles with deionized water; and
(g) drying said silver powder particles.

3. The process of claim 1, wherein said water soluble silver salt is silver nitrate, said reducing agent is ascorbic acid and said surface morphology modifier is sodium citrate.

4. The process of claim 3, said acidic reducing and surface morphology modifier solution further comprising a dispersing agent selected from the group consisting of ammonium stearate, stearate salts, polyethylene glycol with molecular weight ranging from 200 to 8000, and mixtures thereof.

* * * * *